United States Patent [19]

Mroczka

[11] Patent Number: 5,655,302

[45] Date of Patent: Aug. 12, 1997

[54] SHAVING CREAM DISPENSING RAZOR

[75] Inventor: David E. Mroczka, Cromwell, Conn.

[73] Assignee: Double D Development Company L.L.C., Cromwell, Conn.

[21] Appl. No.: 665,230

[22] Filed: Jun. 17, 1996

[51] Int. Cl.[6] .................................................. B26B 19/40
[52] U.S. Cl. ........................................ 30/41; 30/535
[58] Field of Search ........................... 30/41, 41.5, 535, 30/125, 538; 251/321, 330, 339, 149.1; 222/192, 402.25, 501

[56] References Cited

U.S. PATENT DOCUMENTS

| 2,632,446 | 3/1953 | Rosenzweig | 222/501 |
|---|---|---|---|
| 2,761,593 | 9/1956 | Spiess et al. | |
| 3,586,068 | 6/1971 | Nicholson | |
| 4,060,184 | 11/1977 | O'Neil | |
| 4,791,723 | 12/1988 | Jacobson | 30/41 |
| 4,813,138 | 3/1989 | Chen | |
| 4,881,323 | 11/1989 | McGaughan | |
| 4,908,945 | 3/1990 | Jacobson | 30/41 |
| 5,070,611 | 12/1991 | Derin et al. | |
| 5,133,130 | 7/1992 | Podolsky | 30/41 |
| 5,241,751 | 9/1993 | Goh | 30/41.5 |
| 5,287,624 | 2/1994 | Mondo et al. | 30/41 |

*Primary Examiner*—Hwei-Siu Payer
*Attorney, Agent, or Firm*—Chilton, Alix & Van Kirk

[57] ABSTRACT

A razor has a razor head and a handle extending from the razor head. The handle defines a chamber holding pressurized shaving cream. A valve, having oppositely positioned flexible valve flaps biased for sealing engagement, selectively permits the emission of the shaving cream from the chamber. A nozzle defining a tube is insertable between the valve flaps for controlled passage of the shaving cream from the chamber.

16 Claims, 4 Drawing Sheets

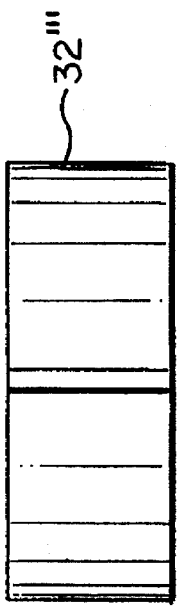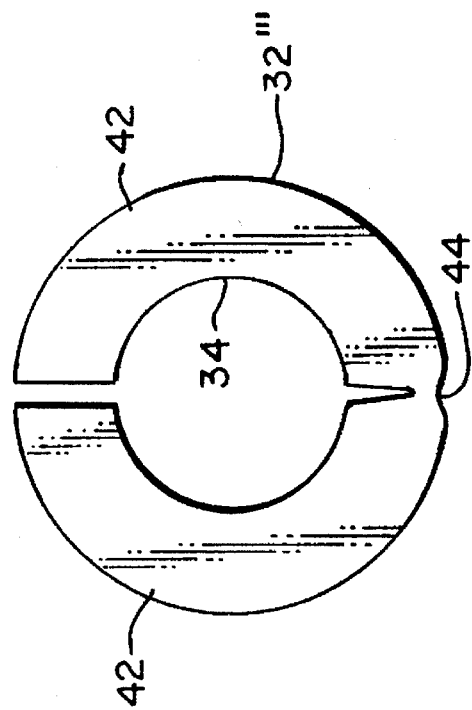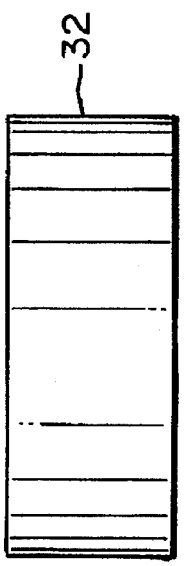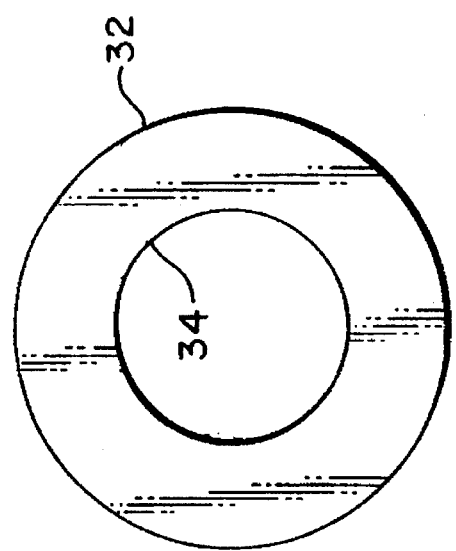

SHAVING CREAM DISPENSING RAZOR

BACKGROUND OF THE INVENTION

This invention relates generally to razors for shaving. More particularly, the present invention relates to a razor having a shaving cream dispenser.

Razors having shaving cream dispensers in the razor handle are known. Such razors are typically intended for sale at convenient locations such as airports and hotels where travelers can replace inadvertently forgotten personal products. Shaving cream dispensing razors are also typically intended for sale to travelers or other purchasers that would prefer not to carry both a shaving cream canister and a razor. These razors will typically be used only once or few times and therefore considered disposable.

In view of the above considerations, cost concerns are of primary importance to reduce the selling price to an acceptable level. However, prior designs have tended to be complicated in structure and require a relatively large number of components. These factors tend to increase both manufacturing and assembly cost therefore decreasing the potential market.

References which disclose razors to which the invention relates are identified below.

| U.S. PAT. No. 4,813,138 | Chen | Mar. 21, 1989 |
| U.S. PAT. No. 4,881,323 | McGaughan | Nov. 21, 1989 |
| U.S. PAT. No. 5,070,611 | Derin et al. | Dec. 10, 1991 |

SUMMARY OF THE INVENTION

Briefly stated, the invention in a preferred form is a razor having a handle forming a pressure chamber to contain pressurized shaving cream. A valve retainer defines a valve opening at the distal end of the razor handle. The valve retainer can be adhesively bonded, welded or snap fit onto the razor handle.

A valve having flexible flaps biased together for sealing engagement is positioned in the valve opening. The valve is preferably a one piece design of an elastometric material selectively openable to allow the dispensing of the pressurized shaving cream. The valve further preferably seals against the interior walls of the pressure chamber to provide a seal between the handle and the valve retainer.

A nozzle assembly having a nozzle tube is insertable into the valve between the valve flaps to provide for the controlled discharge of shaving cream from the pressure chamber. The nozzle assembly is preferably affixed to the valve retainer by a living hinge for simplified positioning of the nozzle tube between the flaps of the valve.

An object of the invention is to provide a shaving cream dispensing razor manufactured in an efficient and cost effective manner.

Another object of the invention is to provide a shaving cream dispensing razor having a small number of components.

A further object of the invention is to provide a shaving cream dispensing razor having improved shaving cream flow control.

A yet further object of the invention is to provide a simplified method of manufacture for a shaving cream dispensing razor.

These and other objects and advantages of the invention will become apparent from the drawings and specification.

BRIEF DESCRIPTION OF THE DRAWINGS

FIG. 6 is a side view of a valve retainer of a shaving cream dispensing razor of the invention;

FIG. 7 is a top view of the valve retainer of FIG. 6;

FIG. 8 is a side view of a hinged valve retainer of a shaving cream dispensing razor of the invention; and FIG. 9 is a top view of a hinged valve retainer of FIG. 8.

DETAILED DESCRIPTION OF THE PREFERRED EMBODIMENT

With reference to the drawings wherein like numerals represent like parts throughout the figures, a shaving cream dispensing razor of the invention is generally designated by the numeral 10. The razor 10 has a razor head 12 supporting a razor blade 15. The razor head 12 and razor blade 15 are of any well-known construction. The razor blade 15 can be permanently mounted to the razor head 12 or disposable.

Figure 2:
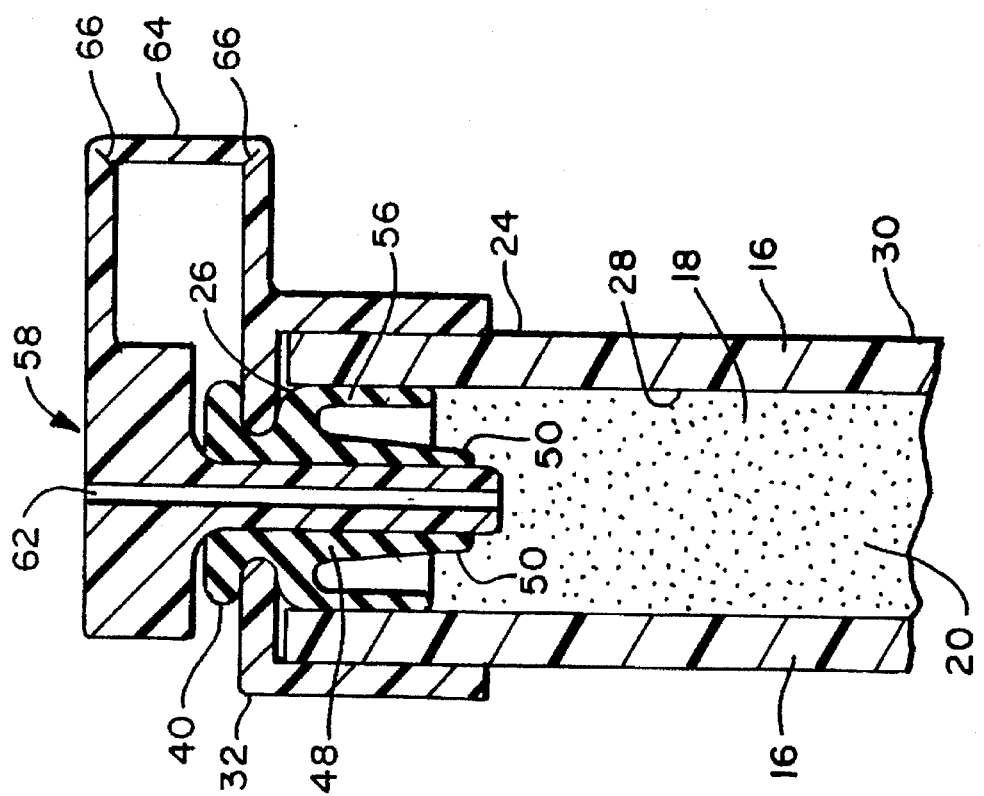
FIG. 2 is a fragmentary enlarged cross-sectional side view of the razor handle, valve retainer valve and an alternate embodiment of the nozzle of FIG. 1 wherein the nozzle is inserted into the valve.

A razor handle 14 extends generally perpendicularly from the razor head 12. The razor head 12 and handle are preferably of a conventional inexpensive one piece plastic construction. The handle 14 is a generally elongated tubular member having a handle wall 16 of preferably a circular cross section for simplified manufacture. The handle 14 defines a proximal end 22 and a distal end 24. The proximal end 22 is closed and affixed to the razor head 12. The closed proximal portion 22 and wall 16 of the handle 14 define a pressure chamber 18. The wall 16 has a structure which is of sufficiently rigid construction to withstand the continual pressure of shaving cream 20 within the pressure chamber 18 without deformation. The wall 16 defines a chamber opening 26 at the distal end 24 of the handle 14. (See FIG. 2) The wall 16 further defines an interior wall surface 28 and an exterior wall surface 30.

A valve retainer 32 is positioned over the chamber opening 26. In the preferred embodiment, the valve retainer 32 extends across the chamber opening 26 and is in surface to surface contact with the exterior wall surface 30 of the handle 14. The valve retainer 32 is a plastic annulus having a retainer wall with an inside radius equivalent to the outside radius of the handle 14. (See FIG. 7) A circular valve opening 34 defined by the valve retainer 32 is contiguous and coaxial with the chamber opening 26. The valve retainer 32 is preferably adhesively bonded on the distal end 24 of the handle 14. The valve retainer 32 can also be fixed to the handle by welding such as ultrasonic welding, or by the valve retainer 32 threadably engaging the exterior wall surface 30.

Figure 1:
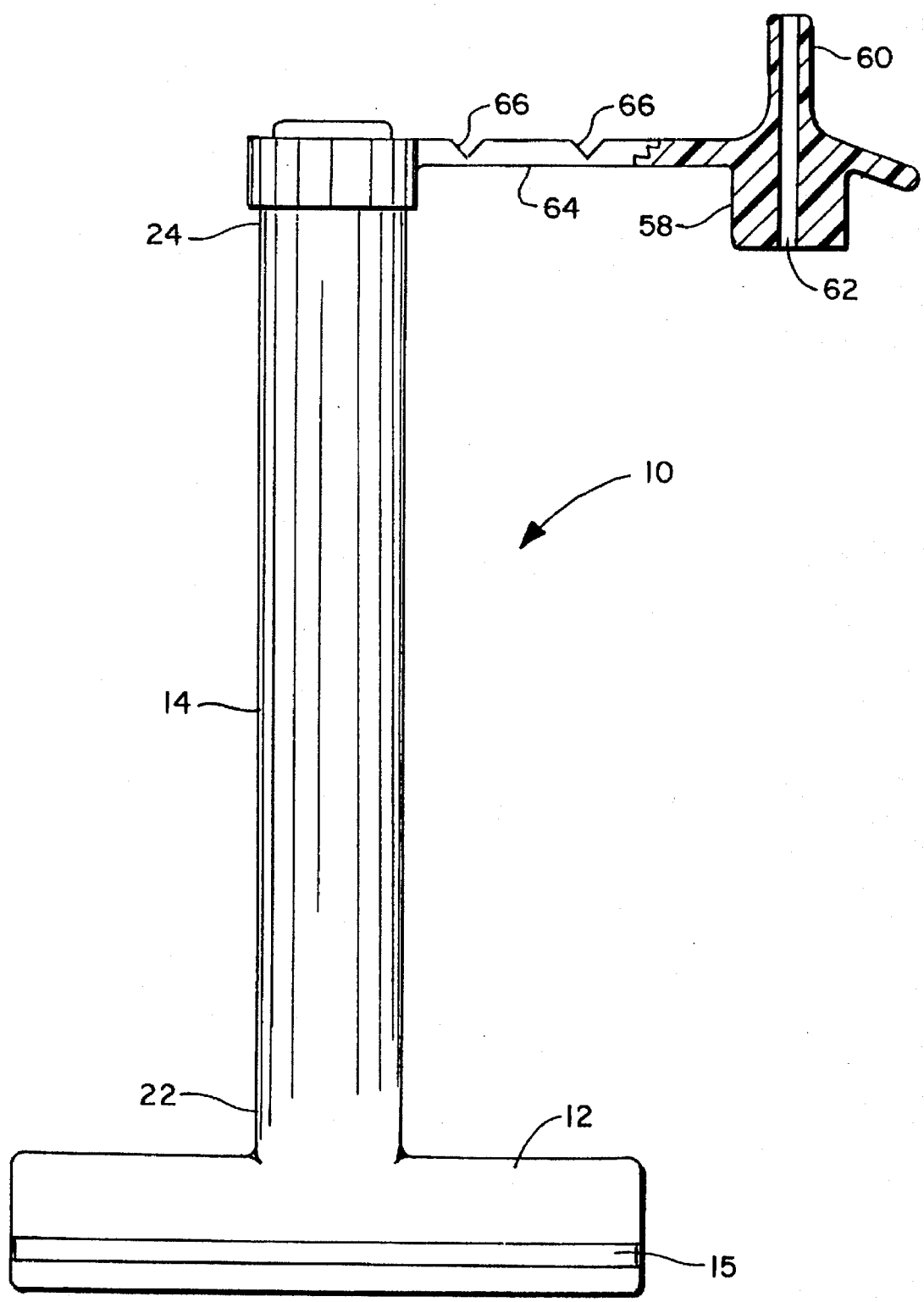
FIG. 1 is a side elevational view, partly in section, of the shaving cream dispensing razor of the invention.
Figure 3:
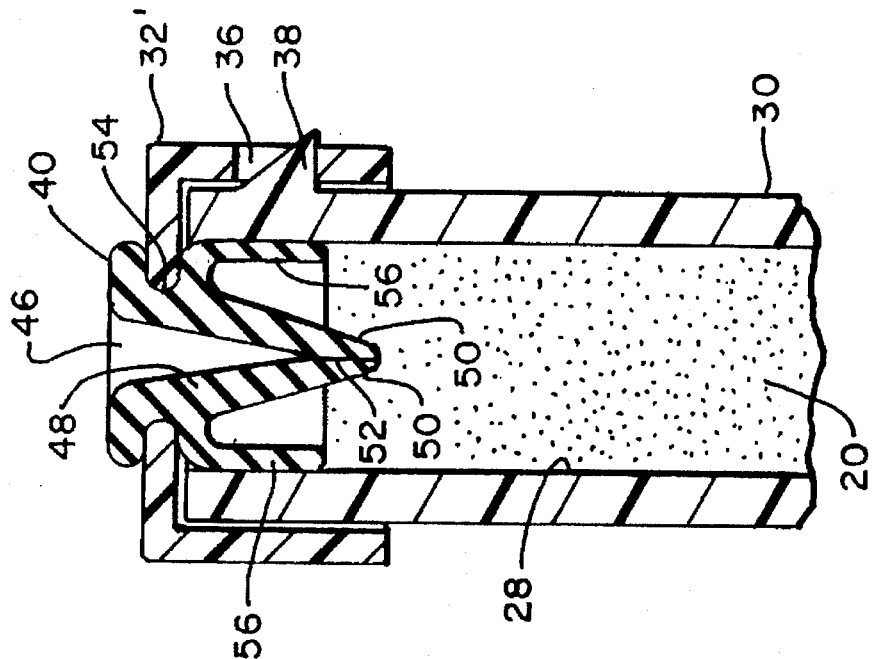
FIG. 3 is a fragmentary enlarged cross-sectional side view of the razor handle and an alternate embodiment of the valve retainer and valve of the shaving cream dispensing razor of FIG. 1.

In one alternate embodiment, a valve retainer 32' can snap fit onto the handle 14. (See FIG. 3) The valve retainer 32' defines a snap opening 36 for receiving a catch 38 molded onto the exterior wall surface 30 of the handle 14. In a further embodiment a valve retainer 32" projects into the chamber opening 26 and contracts the interior wall surface 28. The valve retainer 32" is fixed to the handle by an adhesive, ultrasonic welding, threaded engagement with the handle or other well-known methods of fixation.

In yet another embodiment, the valve retainer 32''' is formed as a split ring defining two semi-circular valve retainer sections 42 swingably joined by a hinge 44. The split ring valve retainer 32''' is preferably of one piece construction wherein the hinge 44 is a living hinge formed by a narrowing of the material of the split ring valve retainer 32'''. The split ring valve retainer 32''' allows for easier manufacture and assembly of the valve retainer 32" to the handle 14 by an adhesive or ultrasonic welding.

A valve 40 mounts through the valve opening 34 in the valve retainer 32 for selective sealing of the pressure chamber 18 from the ambient environment. The valve 40 is preferably constructed of a flexible elastomer which is capable of sealing and resealing after initial charging of the pressure chamber 18 with the shaving cream 20. A valve orifice 46 is defined by the valve and is positioned generally coaxial with the valve opening 34 and chamber opening 26. The valve 40 has a flexible valve wall 48 defining oppositely positioned valve flaps 50 at one end of the valve orifice. The valve flaps 50 are generally molded to be biased together for sealing engagement with each other and to form a valve seal 52 therebetween. The internal pressure of the shaving cream 20 in the pressure chamber 18 further biases the valve flaps 50 together for enhancing the valve seal 52 and for sealing of the pressure chamber 18 from the ambient environment.

The valve 40 further has a narrowed neck portion 54 for tight fitting engagement with the valve opening 34 of the valve retainer 32. In the preferred embodiment, the valve 40 further has a valve outer wall 56 for sealing engagement with the interior wall surface 28 of the handle 14. The valve outer wall 56 is of relatively thin flexible construction wherein the internal pressure of the shaving cream 20 in the pressure chamber 18 creates a seal around the periphery of the valve outer wall. The valve outer wall 56 is forcedly held against the interior wall surface 28 of the handle 14 by the pressure of the shaving cream to seal the pressure chamber 18 from the ambient environment. In an alternate embodiment, where the valve retainer 32" adequately seals the pressure chamber 18, a valve 40' can be employed without the valve outer wall 56. The pressure chamber 18 is sealed from atmosphere by the neck portion 54 and surrounding shoulders of the valve 40 sealing against the valve retainer 32.

A nozzle assembly 58 is inserted into the valve orifice 46 and between the valve flaps 50 for dispensing the shaving cream. The nozzle assembly 58 provides a flow path for the controlled discharge of the pressurized shaving cream from the pressure chamber 18. The nozzle assembly 58 has a nozzle tube 60 defining a flow path 62. The nozzle tube 60 is inserted into the valve orifice 46 between the valve flaps 50 to break the valve seal 52. The pressurized shaving cream 20 then flows through the flow path 62 for use. The flow path 62 provides controlled dispensing of the shaving cream 20 for employment by the razor user.

Figure 4:
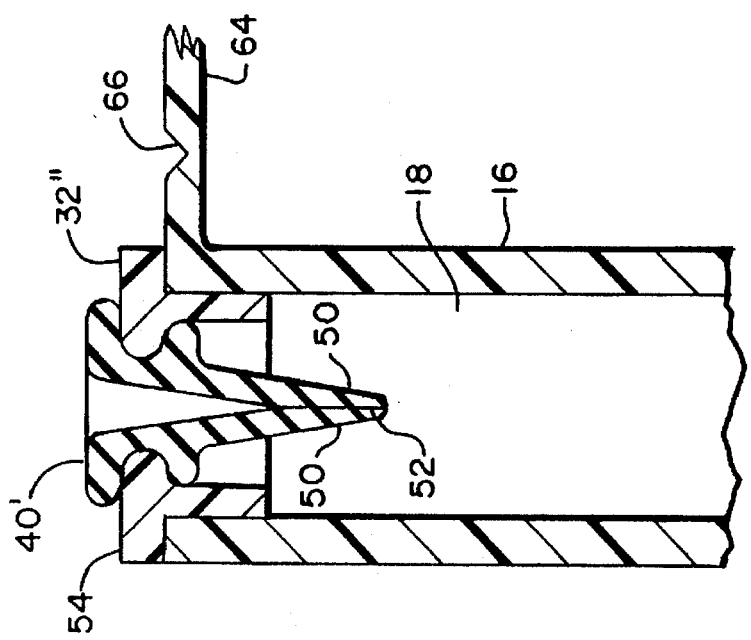
FIG. 4 is a fragmentary enlarged cross-sectional side view of yet another alternate embodiment of the razor handle, valve retainer and valve of the shaving cream dispensing razor of FIG. 1.

Removal of the nozzle assembly permits the valve flaps 52 to re-engage and form the valve seal 52. The nozzle assembly 58 can be manufactured as a separate component for insertion into the valve orifice 46. Preferably, the nozzle assembly 58 is permanently affixed to the razor handle 14 for ease of usage and to prevent loss of the nozzle assembly 58. In the preferred embodiment, the valve retainer 32 and the nozzle assembly 58 are molded as a single unit wherein a hinge assembly 64 connects the valve retainer 32 and nozzle assembly 58. The hinge assembly 64 preferably defines a pair of living hinges 66 interconnected by straight sections wherein when the nozzle assembly 58 is folded over into the valve 40, the nozzle 60 is directed into the valve orifice 46 by the hinge assembly 64. (See FIG. 2) The nozzle assembly 58 and hinge assembly 64 can alternately be molded as a one piece component with the handle 14. (See FIG. 4)

Figure 5:
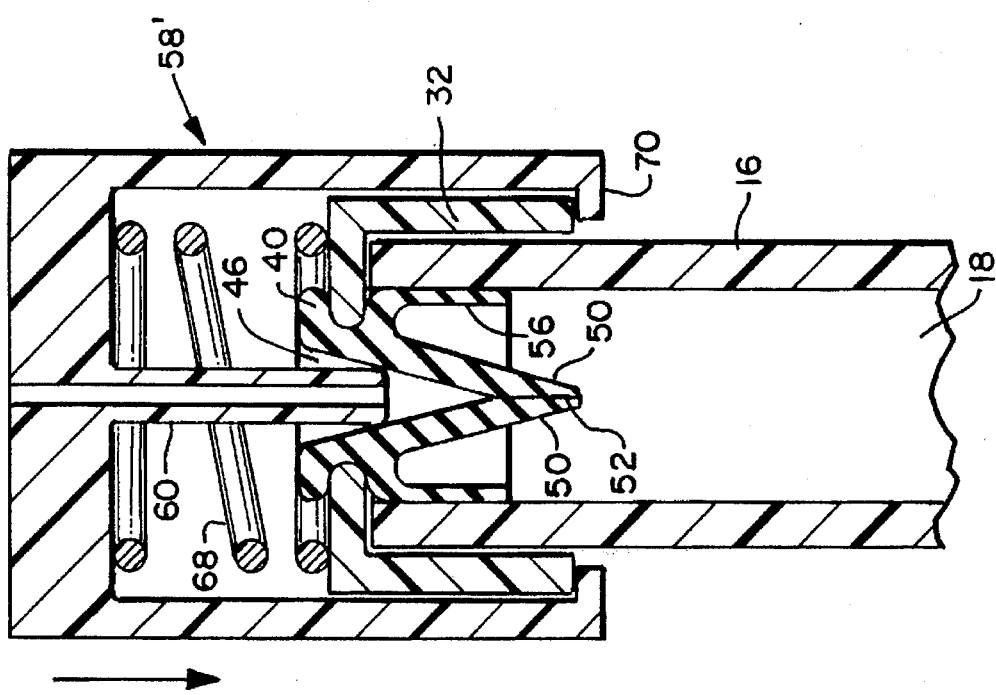
FIG. 5 is a fragmentary enlarged cross-sectional view, partially in phantom of the razor handle, valve retainer valve and spring loaded nozzle assembly of the alternate embodiment of the shaving cream dispensing razor of the invention.

In an alternate embodiment, the nozzle assembly 58' defines a cap extending around the valve retainer 32. (See FIG. 5) The nozzle assembly 58' defines an internal radius generally greater than the outer radius of the valve retainer 32. The nozzle assembly 58' supports the nozzle tube 60 over the valve orifice 46. The nozzle assembly 58' slidably engages the valve retainer 32 and handle 14 to move in the longitudinal direction relative to the handle 14. The nozzle assembly 58' has a first position wherein the nozzle 60 is positioned in the valve orifice 46 but wherein the valve flaps 50 continue to define the valve seal 52. The nozzle assembly 58' is movable to a second position wherein the nozzle 60 slides between the valve flaps 50 to provide the flow path 62 for the shaving cream. A spring 68 biases the nozzle assembly 58' to the first position. The nozzle assembly 58' is retained over the distal portion of the handle by perpendicularly projecting legs 70 engaging the bottom edge of the valve retainer 32.

In a further embodiment of the invention (not shown), the handle 14 supports a separate pressure chamber of canister. The canister is insertable into the distal end of the handle and can be replaced when empty of shaving cream. The canister employs the same valve 40 and nozzle assembly 58 described above.

While a preferred embodiment of the present invention has been illustrated and described in detail, it should be readily appreciated that many modifications and changes thereto are within the ability of those of ordinary skill in the art. Therefore, the appended claims are intended to cover any and all of such modifications which fall within the true spirit and scope of the invention.

I claim:

1. A razor comprising:

a razor head;

a handle extending from said razor head;

chamber means within said handle for defining a fluid tight shaving cream chamber and defining a chamber opening forming a fluid passage into said chamber;

valve means at said chamber opening for selectively permitting shaving cream to emit from said chamber, said valve means comprising oppositely positioned flexible valve flaps biased for sealing engagement; and nozzle means comprising a tube defining a flow opening, said tube insertable between said valve flaps for passage of shaving cream from said chamber.

2. The razor of claim 1 wherein said handle comprises a plurality of longitudinal extending walls, said walls defining said chamber means.

3. The razor of claim 1 further comprising hinge means extending between said handle and said nozzle means for hingedly positioning said nozzle means between said valve flaps.

4. A razor comprising:

a razor head;

a tubular handle defining an exterior surface and an interior surface and further defining a pressure chamber, said handle extending from said razor head, said handle having a proximal end portion and a distal end portion said proximal end portion fixed to said razor head and said distal end portion defining a chamber opening in fluid connection with said pressure chamber;

valve means in said chamber opening, said valve means comprising oppositely positioned flexible valve flaps biased together for sealing engagement;

pressurized shaving cream in said pressure chamber; and nozzle means comprising a tube defining a flow passage insertable between said valve flaps for passage of said shaving cream from said chamber.

5. The razor of claim 4 wherein said valve means comprises a valve retainer extending over said chamber opening and defining a retainer opening continuous with said chamber opening and a valve body in said retainer opening.

6. The razor of claim 5 wherein said retainer contacts said exterior surface of said handle.

7. The razor of claim 5 wherein said retainer contacts said interior surface of said handle.

8. The razor of claim 5 further comprising a hinge means extending between said retainer and said nozzle means for hingedly positioning said nozzle means between said valve flaps.

9. The razor of claim 8 wherein said hinge means comprises a living hinge.

10. The razor of claim 5 wherein said nozzle means comprises of a nozzle cap extending over said retainer and slidably engaging said exterior wall of said handle, said cap having a first position, wherein said tube is away from said valve flaps and a second position wherein said tube is between said valve flaps.

11. The razor of claim 10 further comprising spring means positioned between said retainer and said nozzle cap for biasing said nozzle cap to said first position.

12. The razor of claim 5 wherein said valve body sealably engages said interior surface of said handle.

13. The razor of claim 5 wherein said valve retainer is a split ring having a living hinge.

14. A razor comprising:

a razor head comprising a razor blade;

a handle extending from said razor head;

chamber means within said handle for defining a fluid tight shaving cream chamber and defining a chamber opening forming a fluid passage into said chamber;

pressurized shaving cream in said chamber;

valve means at said chamber opening for selectively permitting said shaving cream to emit from said chamber, said valve means comprising oppositely positioned flexible valve flaps biased for sealing engagement; and nozzle means comprising a tube defining a flow opening, said tube insertable between said valve flaps for passage of said shaving cream from said chamber.

15. The razor of claim 14 wherein said handle comprises a plurality of longitudinal extending walls, said walls defining said chamber means.

16. The razor of claim 14 further comprising hinge means extending between said handle and said nozzle means for hingedly positioning said nozzle means between said valve flaps.

* * * * *